(12) United States Patent
Lu et al.

(10) Patent No.: US 8,504,820 B2
(45) Date of Patent: *Aug. 6, 2013

(54) METHOD FOR IMPROVING NETWORK APPLICATION SECURITY AND SYSTEM THEREOF

(75) Inventors: Zhou Lu, Beijing (CN); Huazhang Yu, Beijing (CN)

(73) Assignee: Feitian Technologies Co., Ltd, Beijing (CN)

( * ) Notice: Subject to any disclaimer, the term of this patent is extended or adjusted under 35 U.S.C. 154(b) by 343 days.

This patent is subject to a terminal disclaimer.

(21) Appl. No.: 12/863,444

(22) PCT Filed: Apr. 19, 2010

(86) PCT No.: PCT/CN2010/071900
§ 371 (c)(1),
(2), (4) Date: Jul. 19, 2010

(87) PCT Pub. No.: WO2010/139210
PCT Pub. Date: Dec. 9, 2010

(65) Prior Publication Data
US 2011/0113251 A1   May 12, 2011

(30) Foreign Application Priority Data
May 31, 2009   (CN) .......................... 2009 1 0086341

(51) Int. Cl.
H04L 29/06   (2006.01)
(52) U.S. Cl.
USPC ........... 713/151; 713/165; 713/166; 713/167; 726/26; 726/30
(58) Field of Classification Search
None
See application file for complete search history.

(56) References Cited

U.S. PATENT DOCUMENTS

2004/0100975 A1*   5/2004   Kreiner et al. ................ 370/401
2006/0168653 A1*   7/2006   Contrera .......................... 726/9

* cited by examiner

Primary Examiner — Pramila Parthasarathy
(74) Attorney, Agent, or Firm — Soroker-Agmon; Daniel Schatz

(57) ABSTRACT

The invention, related to information security field, discloses a method for improving network application security and a system thereof. The method comprises that client terminal application generates protocol message and disassembles the protocol message to plural IP packets and sends the plural IP packets; network filter driver receives and caches the plural IP packets and assembles the plural IP packets to obtain the protocol message and determines whether critical information is in the protocol message; if so, the network filter driver sends the protocol message to a smart key device; the smart key device analyzes the protocol message to obtain the critical information and sends the critical information to the user for confirming, if the user confirms that the critical information is correct, the network smart key device signs the protocol message and returns the signature data, the network filter driver generates new protocol message according to the signature data and the protocol message and disassembles the new protocol message to plural IP packets and sends the plural IP packets to the server via network card driver; if the user confirms that the critical information is not correct or no confirmation is received from user in predetermined time period, the smart key device performs exceptional operation. The system comprises a smart key device and network filter driver of client terminal computer. With compatibility and usability, the invention enhances network application security without modifying the client terminal.

18 Claims, 2 Drawing Sheets

METHOD FOR IMPROVING NETWORK APPLICATION SECURITY AND SYSTEM THEREOF

FIELD OF THE INVENTION

The invention relates to information security field, and more particularly, relates to a method for improving network application security and system thereof.

BACKGROUND OF THE INVENTION

With the flourishing development of network, people rely more on network to take part in all kinds of activities. Some activities, such as e-bank or shopping-online. etc. became part of human life already. But illegal activities, for example, stealing password by hacker for illegal trade online happens more, which bring a great deal of loss to a user. While enjoying the convenience brought by the internet, the people are concerned about the security of the internet more and more. The authentication technology seems to be particularly important. Now the authentication technology is applied wildly in all kinds of fields, for example, e-bank, government website, Enterprise Resource Planning system based on Browser/Server or the fields required high-level secrecy, etc.

Digital signature scheme is one of the methods for network security. In the scheme, with the digital certificate downloaded and installed at client terminal, a smart key device such as a highly secured USB key (Universal Serial BUS Key) etc. signs the data transferred by network. Since the signed data inside the USB key is still transferred by the computer of client terminal, so the risks still exist in the scheme.

Furthermore, the operation of most of the existed protecting means is too complicated. Many kinds of plugs or software program corresponding to the USB key needs to be installed in signing processing. In addition, most application or insert, which is developed for IE (Internet Explorer) kennel, can not be supported by other browsers such as Firefox, etc. So that some users can not communicate safely and normally on the network.

What described above shows that the shortcomings of the protecting methods in the prior art for the network security are with fussy operating, bad usability and compatibility, low security.

SUMMARY OF THE INVENTION

A method for improving network application security, comprising:

generating, by a client terminal application of a client terminal computer, a protocol message according to information input by a user and disassembling the protocol message to a plurality of IP packets;

receiving and caching, by a network filter driver of the client terminal computer, the plurality of IP packets and assembling the plurality of IP packets to obtain the protocol message;

analyzing, by the network filter driver, the protocol message according to a predetermined protocol, to determine whether critical information predetermined by the network filter driver, a smart key device and an application server is in the protocol message;

if the critical information is in the protocol message, sending, by the network filter driver, the protocol message to the smart key device; and analyzing, by the smart key device, the protocol message to obtain the critical message and outputting the critical message to the user for confirmation;

if the user confirms that the critical message is correct, signing, by the smart key device, the protocol message and returning a signature data to the network filter driver, generating, by the network filter driver, a new protocol message according to the signature data and the protocol message, and disassembling the new protocol message to a plurality of IP packets and sending the plurality of IP packets to the application server via network card driver;

if the user confirms that the critical information is not correct or no confirmation information is received from the user within a predetermined time period, performing an exceptional operation by the smart key device;

if the critical information is not in the protocol message, sending, by the network filter driver, the cached plurality of IP packets to the application server via the network filter driver.

A system for improving network application security, comprising:

a smart key device and a network filter driver of a client terminal computer;

the network filter driver comprises a first interface module, adapted to receive a plurality of IP packets from a client terminal application in the client terminal computer, wherein the plurality of IP packets are obtained by disassembling a protocol message generated by the client terminal application according to information input by a user, and to communicate with the smart key device, to send the protocol message to the smart key device, and to receive signature data returned by the smart key device; and further adapted to send the plurality of IP packets obtained by disassembling a new protocol message to a network card driver which sends the plurality of IP packets to the application server;

a storage module, adapted to cache the plurality of IP packets received by the first interface module;

a packet assembling module, adapted to assemble the plurality of IP packets received by the first interface module to obtain the protocol message;

an analyzing and determining module, adapted to analyze the protocol message obtained by the packet assembling module according to the predetermined protocol and determine whether critical information, which is predetermined by the network filter driver, the smart key device and the application server, is in the protocol message, and send the protocol message to the smart key device via the first interface module if the critical information is in the protocol message, or send the plurality of IP packets cached by the storage module to the network card driver, which sends the plurality of IP packets to the application server, via the first interface module;

a protocol message generating module, adapted to generate the new protocol message according to the signature data received by the first interface module and the protocol message received by the packet assembling module;

a disassembling module, adapted to disassemble the new protocol message, generated by the protocol message generating module, to a plurality of IP packets and send the plurality of IP packets to the network card driver in the client terminal computer via the first interface module;

the smart key device comprises a second interface module, adapted to communicate with the network filter driver to receive the protocol message sent from the network filter driver, and to send signature data to the network filter driver;

a filter module, adapted to analyze the protocol message received by the second interface module of the smart key device to obtain the critical information;

an outputting module, adapted to output the critical information obtained by the filter module to the user for confirmation;

a determining module, adapted to receive the confirmation information indicating whether the critical information is correctly input by the user;

a signing module, adapted to sign the protocol message received by the second interface module of the smart key device to obtain the signature data and return the signature data to the network filter driver via the second interface module if the confirmation information is that the user confirms that the critical information is correct; and an exceptional processing module, adapted to perform an exceptional operation if the confirmation information is that the user confirms that the critical information is incorrect or if no confirmation information is received from the user within a predetermined time period.

DETAILED DESCRIPTION OF THE INVENTION

Objects, technical solutions and advantages of the invention will be easily understood by reference to the following description of embodiments when read in conjunction with the accompanying drawings.

The embodiment of the present invention provides a method for improving network application security, which comprises that application of a client terminal computer generates protocol message according to the information input by a user and disassembles the protocol message into plural IP packets; the network filter driver in the client terminal computer receives and caches the plural IP packets and assembles the plural IP packets to obtain the protocol message; the network filter driver analyzes the protocol message according to predetermined protocol and determines whether critical information, which is predetermined by the network filter driver, a smart key device and a server, in the protocol message, if so, the network filter driver transfers the protocol message to the smart key device, the smart key device analyzes the protocol message to obtain the critical information and outputs the critical information for the user to confirm; if the user confirms that the critical information is correct, the smart key device signs the protocol message and returns signature data to the network filter driver, the network filter driver generates new protocol message according to the signature data and the original protocol message and disassembles the new protocol message into plural IP packets and transfers the plural IP packets to the application server, if the user confirms that the critical information is incorrect or no confirmation from the user is received, the smart key device processes exceptionally; if the critical information is not in the protocol message, the network filter driver transfers the cached plural IP packets to the application server via the network card driver.

The application server in the embodiment of the invention refers to the destination website server for the client terminal to require service. With many types, the application server comprises but not limits to server for e-commerce system, server for e-bank system, etc. The network filter driver refers to functional module installed in the client terminal computer. The functional module can receive, cache and process the IP packets sent to the network card from upper layer application of computer. The network card can be general PC network card or wireless network card, etc.

Embodiment 1

Figure 1:
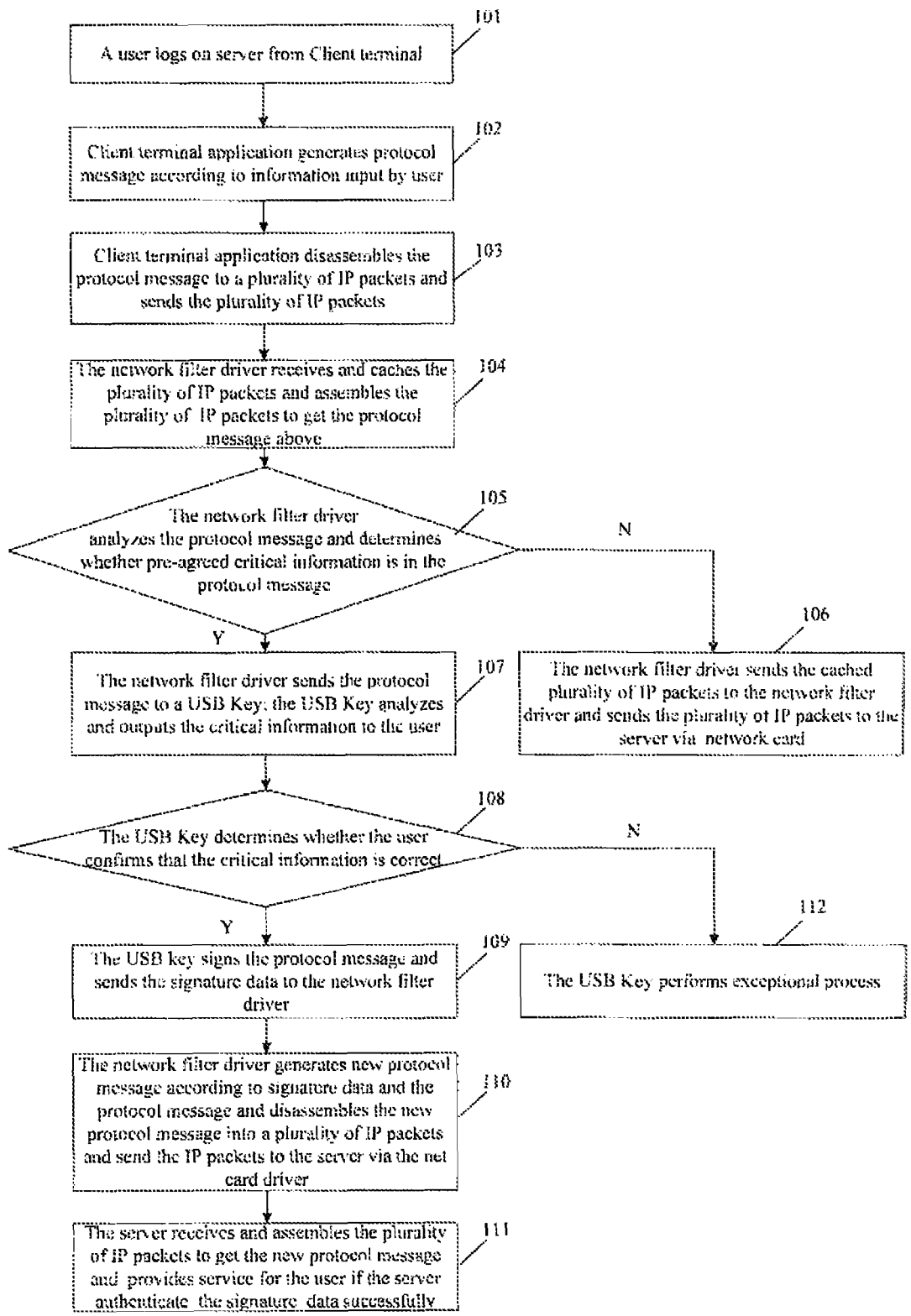
FIG. 1 is a flow chart illustrating a method for improving network application security of Embodiment 1 according to the present invention.

Referring to FIG. 1, the embodiment provides a method for improving network application security, which comprises Step 101, a user logs on an application server at the client terminal. For example, the user inputs the related information for logging on e-bank system in the embodiment.

In the step, the user can access the e-bank system via Internet Explorer of the system or client terminal application like other browsers. Furthermore, no plugs need to be installed or no client terminal application needs to be modified.

Step 102: the client terminal application receives the information input by the user and generates protocol message according to the information;

Furthermore, the client terminal, a smart key device or the application server can predetermine critical information, as the basis for the user to confirm, in the protocol message. If the protocol message contains the critical information, the user needs to determine whether the critical information is correct. For example, if the critical information is important information relating to transfer money in e-bank system, the user can not transfer money in the e-bank system unless the user confirms that the important information is correct.

In order to extract the critical information easily in the future, in addition, critical information identifier can be added in the protocol message for identifying the critical information input by the user. The critical information identifier can be predetermined by the smart key device, the application server and the proxy server. In the embodiment, in the process of money transfer by a user in e-bank system, the protocol message generated at the client terminal comprises protocol content and request header field. The protocol content in XLM format is as the follows:

```
<?xml version="1.0" encoding="gb2312"?>
<!--business data--!>
<TradeInfo>
    <AccountInfo name="To"><!-Transfer In account--!>
        <AccountName>ZhangSan</AccountName><!--Transfer   In   Account Name--!>
        <AccountValue>12345678</AccountValue><!-- Transfer In Account Number--!>
        <!-- Transfer In bank information--!>
        <BankInfo>
            <BankName>MMM bank</BankName><!-- Transfer In MMM
```

```
bank --!>
            </BankInfo>
        </AccountInfo>
        <AccountInfo name="From">
            <AccountName>Li Si</AccountName><!-- Transfer Out Account Name --!>
            <AccountValue>12345678</AccountValue><!--Transfer Out Account Number--!>
            <!-- Transfer Out bank information --!>
            <BankInfo>
                <BankName>NXN bank</BankName><!--  Transfer  Out bank--!>
            </BankInfo>
        </AccountInfo>
        <TradeData>
            <TradeMoney>134.22</TradeMoney>        <!-Transfer Amount-->
            <TradeType>1</TradeType>               <!-Trade type-->
            <MoneyType>2</MoneyType>               <!-Currency type-->
            <TradeTime>20090206152645</TradeTime>  <!-Trade time-->
            <OtherData></OtherData>                <!-Other data-->
        </TradeData>
        <SignatureData>
        </SignatureData>
    </TradeInfo>
```

Three kinds of information as Transfer In account name, Transfer In account number and Transfer amount, which are input by the user in the transfer process, are predetermined, that is, if the Transfer In account name is Zhang San, the Transfer In account number is 12345678 and the Transfer amount is 134.22, the critical information identifier is as the follows:

```
    <AccountName>Zhang San</AccountName>           <!-- Transfer In Account Name --!>
    <AccountValue>12345678</AccountValue>  <!--Transfer     In Account Number--!>
    <TradeMoney>134.22</TradeMoney>        <!--    Transfer amount -->
```

<AccountName>and</AccountName> identifies Transfer In account name. <AccountValue>and</AccountValue> identifies Transfer In account number. The <TradeMoney>and</TradeMoney> identifies Transfer amount. The network filter driver and the application server of bank may determine whether the critical information is in the protocol message according to the above critical information identifier and locate the position of the critical information.

In the example above, there is no signature data in the protocol content, so that the field of <SignatureData></SignatureData> is blank.

The protocol message further comprises request header field which is added according to predetermined protocol by the client terminal. In the embodiment, the predetermined protocol is but not limited to be http protocol (Hypertext Transfer Protocol) and/or https protocol (Hypertext Transfer Protocol over Secure Socket Layer). There are many kinds of request header field corresponding to each protocol. For example, the request header fields corresponding to http protocol include but not limited to OPTIONS, GET, HEAD, POST, PUT, DELETE and TRACE, etc. Preferably, the request header field can be POST, which is as the follows:
POST /transfer.cgi HTTP/1.1\r\n
Host: 219.168.0.1\r\n
Content-Length: 512\r\n\r\n
POST=M The M represents protocol content in above XML format. The request header field applies http1.1 protocol. /transfer.cgi is application of the application server of bank side for processing trade in e-bank system. 219.168.0.1 is the address of the server of hank to be accessed. The length of the protocol message is 512.

Step 103: the client terminal application disassembles the protocol message into plural IP packets, and sends the plural IP packets.

Specifically, the client terminal application may call the interface of system and disassemble the protocol message of the upper layer into plural IP packets with fixed length according to the lower layer TCP/IP protocol, and send the plural IP packets to the network card driver, and then the plural IP packets transformed by hardware is sent to network. In the embodiment, because the network filter driver program is between the network system and the operating system, the operating system sends the plural IP packets to the network filter driver and then the network filter driver sends the plural IP packets to the network card driver. Every IP packet comprises destination address to which the IP packet is sent, source address, serial number of IP packet, a part of protocol message, and the length of the protocol message.

Step 104: the network filter driver receives and caches the plural IP packets and arranges the IP packets, and then assembles the IP packets to obtain the protocol message above;

In the embodiment, the specific process of assembling the IP packets by the network filter driver is as the follows:

The network filter driver processes one IP packet each time and analyzes the destination address out from each IP packet. If the destination address is not the pre-stored address of the application server, the network filter driver will not perform any extra process and will send the IP packet to the network card driver directly. If the destination address is the pre-stored address of the application server, the network filter driver will cache the IP packet and will not send the IP packet to the network card driver until the protocol message is disassembled to obtain all of the IP packets. The IP packet contains the length of the whole protocol message and the network card driver determines the total number of the IP packets according to the length. Once the IP packets obtained by disassembling the protocol message are received by the network card driver, protocol message parts contained in every IP packet are taken out and are arranged according to the serial numbers of the IP packets and the protocol message described above is obtained.

The network filter driver can pre-store addresses of many application servers and modify the configuration as required. In order to enhance the security, the addresses of many application servers can be encrypted and stored.

Step 105: the network filter driver analyzes the protocol message got by assembling the plural IP packets and determines whether the critical information predetermined by the network filter driver, the smart key device and the application is contained in the protocol message, if the critical information is contained in the protocol message, go to step 107; otherwise go to step 106;

That the network filter driver analyzes the protocol message means that the protocol message is disassembled into the request header field part and the protocol content part according to the current applied protocol. The network filter driver determines whether the critical information is contained in the protocol content after the analysis.

In the step, the network filter driver may choose any one from the two ways described below to determine whether the critical information is contained in the protocol message:

1) determining whether critical information identifier, predetermined by the network filter driver, the smart key device and the application server, is contained in the protocol message, if the critical information identifier is contained in the protocol message, determining that the critical information is contained in the protocol message; otherwise, no critical information is contained in the protocol message;

For example, determining whether the critical information identifier, like <AccountName> and </AccountName>, is contained in the protocol content after obtaining the protocol content obtained by analyzing the protocol message, if so, reading the data between the <AccountName> and </AccountName> to obtain the critical information of Transfer In account number; determining whether critical information identifier, like <AccountName> and </AccountName>, is contained in the protocol content, if so, reading the data between the <AccountName> and </AccountName> to obtain the critical information of the Transfer In account Name; determining whether critical information identifier, like <AccountValue>and</AccountValue>, is contained in the protocol content, if so, reading the data between the <AccountValue>and</AccountValue> to obtain the critical information of Transfer In account Number; determining whether critical information identifier, like <TradeMoney> and </TradeMoney>, is contained in the protocol content, if so, reading the data between the <TradeMoney> and </TradeMoney> to obtain the transfer amount. If one of the three kinds of critical information identifiers predetermined by the network filter driver, the smart key device and the application server is not blank, the critical information is contained in the protocol content; if all of the critical information identifiers are blank, the critical information is not contained in the protocol content.

2) The network filter driver analyzes the protocol message according to the predetermined protocol, finds the field specified by the network filter, the smart key device and the application server, and determines whether there is data in the field, if so, the critical information is contained in the protocol message.

Furthermore, in the step 105, if the critical information is contained in the protocol message, the network filter driver authenticates the application server address written in the request header field of the protocol message obtained by assembling the plural IP packets, if the authentication is success, that is to say, the application server address written in the request field header is accorded with the application server address pre-stored by the network filter driver, go to step 107; otherwise, prompting the user that the application server is error and ending the process.

Step 106: the network filter driver sends the cached plural IP packets to the network card driver and sends the plural IP packets to the application server of network via network card. In the embodiment, the plural IP packets are sent to the server of e-bank system. The client terminal and the application server perform interaction with each other; the process is ended;

Step 107: the network filter driver sends the protocol message obtained by assembling the plural IP packets to a USB Key, the USB Key analyzes the received protocol message to obtain the critical information and outputs the critical information for the user to confirm;

In the step 107, the USB Key can analyze the protocol message to obtain the critical information by one of the following two ways:

1) the USB Key determines whether the critical information identifier, which is predetermined by the network filter driver, the smart key device and the application server, is contained in the protocol message, if so, the USB key reads the critical information according to the critical information identifier;

2) the USB key analyzes the protocol message and finds the field specified by the network filter driver, the smart key device and the application server in the protocol message, and then determines whether there is data in the field, if so, the USB Key reads the data to obtain the critical information.

Specifically, the USB Key can output the critical information via the LCD display for the user to confirm, or the USB Key can broadcast the critical information for the user to confirm by the way of voice broadcast. The USB key can compose the critical information and output the critical information in standard format. For example, if the USB key got the information comprises Transfer In account number 12345678, Transfer In account name Zhang San and transfer amount 134.22, the USB Key outputs the critical information via LCD display in the following format for the user to confirm:

Account Number: 12345678
Account Name Zhang San
Sum: 134.22

In addition, the USB Key may send the critical information to the client terminal computer and the client terminal computer prompts the user to confirm the critical information.

Step 108: the USB Key receives the confirmation information from the user and determines whether the user confirms that the critical information is correct, if the user confirms that the critical information is correct, go to step 109; if the user confirms that the critical information is not correct or the USB Key does not obtain the confirmation information from the user within a predetermined time period, go to step 112;

The predetermined time period is preserved for the user to input the confirmation information. The confirmation information input within the predetermined time period is valid; If the user inputs the confirmation information overpasses the predetermined time period, the confirmation information is invalid.

Step 109: the USB Key signs the received protocol message and sends the signature data to the network filter driver.

Specifically, before USB Key signs the protocol, it authenticates the user's identification by the user's biometric features such as PIN (personal identification number), or fingerprints or iris, or vein features and so on. Specifically, PIN code authentication is illustrated in the embodiment. The detail is as the follows:

The USB Key prompts the user of inputting a PIN code by display or voice broadcast. The user inputs PIN code via the keyboard of the USB Key. The USB Key receives the PIN code and determines whether the PIN code is correct, if the PIN code is correct, the USB Key signs the protocol message and sends the signature data to the network filter driver; otherwise, the USB Key prompts the user to input PIN code one more time or ends the operation.

Alternatively, the process of PIN code authentication by the USB Key can be performed in the following way:

The USB Key sends requirement of authenticating the PIN code to the application of client terminal. The application of client terminal prompts the user to input PIN code, receives the PIN code and sends the received PIN code to the USB Key. The USB Key authenticates the PIN code and determines whether the PIN code is correct; if so, the USB key signs the protocol message and sends the signature data to the network filter driver; otherwise, the USB Key prompts the user to input the PIN code one more time or ends the operation.

In the embodiment of the invention, the USB Key can authenticate the PIN code only at the beginning of every time of transferring money in e-bank system, or authenticate the PIN code before every time of signing operation.

In addition, when the USB Key signs the protocol message, the USB Key can sign the whole protocol content or only part of the protocol message. For example, the USB key is predetermined to sign the critical information only, as the account number 12345678, the account name Zhang San and the transfer amount 134.22 described above, in the protocol message only. Preferably, with HASH algorithm, what can be got from signing the critical information described above is:

"MualIO9msIOE1IuIiH22Z8N57PzagkURnlxUgkn
TTXi88t+9ulTzg0ltcYZWdG+D3LOgDXfejPtjx01HSt293
usQhRTt5SW8qte241Uvw0eMC0YHzH3Iwu0Jb5KE
rXrsg0OMWFZMnhbjF33pGloQWMC23pe6Z98XCcn
KR3nqBdY=".

Step 110: the network filter driver receives the signature data, generates new protocol message according to the signature data and the protocol message, and then disassembles the new protocol message into plural IP packets and sends the plural IP packets to the network card driver, the network card driver processes the plural IP packets and sends the processed plural IP packets to the network via network card hardware; finally, the processed plural IP packets is received by the application server.

Specifically, the process that the network filter driver generates the new protocol message comprises:

inserting the signature data returned by the USB Key in the protocol message obtained by assembling the plural IP packets to obtain the new protocol message, and modifying the request header field in the protocol message according to the predetermined protocol to obtain the new protocol message. The signature data inserted can be in the form of base64 code.

In the embodiment, the signature data which is inserted between the <SignatureData> and </SignatureData> is as the follows:

```
<SignatureData>
   MualIO9msIOE1IuIiH22Z8N57PzagkURnlxUgknTTXi88t+
9u1Tzg0ltcYZWdG+D3LOgDXfejPtjx01HSt293usQhRTt5SW8qte24I
Uvw0eMC0YHzH3Iwu0Jb5KErXrsg0
OMWFZMnhbjF33pGloQWMC23pe6Z98XCcnKR3nqBdY=
   </SignatureData>
```

Due to the insertion of the signature data, the length of the protocol message is changed. So that the request header field in the protocol message is modified as the follows:

POST /transfer.cgi HTTP/1.1\r\n
Host:www.domain.com\r\n
Content-Length: 528\r\n\r\n
POST=N N refers to the protocol content with the inserted signature data.

Besides the way of inserting signature data described above, the network filter driver may substitute specified part in the protocol message with signature data and modify the request header field in the protocol message according to the predetermined protocol to obtain new protocol message. The specified part, which is predetermined by the network filter driver, maybe the whole protocol message or part of the protocol message. For example, the network filter driver substitutes the data between the specified <SignatureData> and </SignatureData> with the signature data. Thereby, when the client terminal application generates protocol message, false signature data can be inserted between the specified <SignatureData> and </SignatureData> as initial value. When the network filter driver generates new protocol message, the network filter driver substitutes the original false signature data with the signature data returned by the USB Key and modifies the request header field as well to obtain the new protocol message.

In step 110, the process that the network filter driver disassembles the new protocol message into plural IP packets is as the follows.

In the embodiment, TCP/IP protocol is preferable. The network filter separates the new protocol message to plural data segments with fixed length and adds new IP protocol packet header for every data segment, and arranges the data segments in order and allocates a serial number written into the IP packet header. Thereby, the IP protocol header further comprises IP version, Internet Header Length, total length of the segment, destination address, sourcing address etc. When the process of disassembling the new protocol message is finished, the network filter driver sends the plural IP packets to the network card driver.

Step 111: the application server receives the plural IP packets and assembles the plural IP packets to obtain the new protocol message above, then analyzes the new protocol message and authenticates the signature data in the new protocol message, and provides service for the client terminal if the authentication is successful and performs account transfer online; the process is ended;

Step 112: the USB Key performs exceptional operation; the process is ended.

The exceptional operation comprises that the USB Key refuses to sign the protocol message and informs the network filter driver to stop operation and prompts error to the user; or, that the USB Key returns a false signature data to the network filter driver which causes the failure of account transfer online.

In the embodiment, the USB Key can not output the received critical information for the user to confirm and sign the protocol message directly and returns the signature data to the proxy server. The proxy server generates new protocol message according to the signature data and the protocol content and sends the new protocol message to the application server.

In the embodiment, in order to obtain higher security, step 106 can be substituted by the follows.

The network filter driver sends the protocol message to the USB Key. The USB Key signs the protocol message and returns signature data to the network filter driver. The network filter driver generates new protocol message according to the signature data and the protocol message (by inserting signature data or substituting false signature data with true signature data) and disassembles the new protocol message to plural IP packets and sends the plural IP packets to the network card driver. The plural IP packets are sent to the application server via network card. The application server assembles the received plural IP packets to obtain the new protocol message and analyzes the signature in the new protocol message. If the authentication is success, the application server will provide service to client terminal.

Embodiment 2

Figure 2:
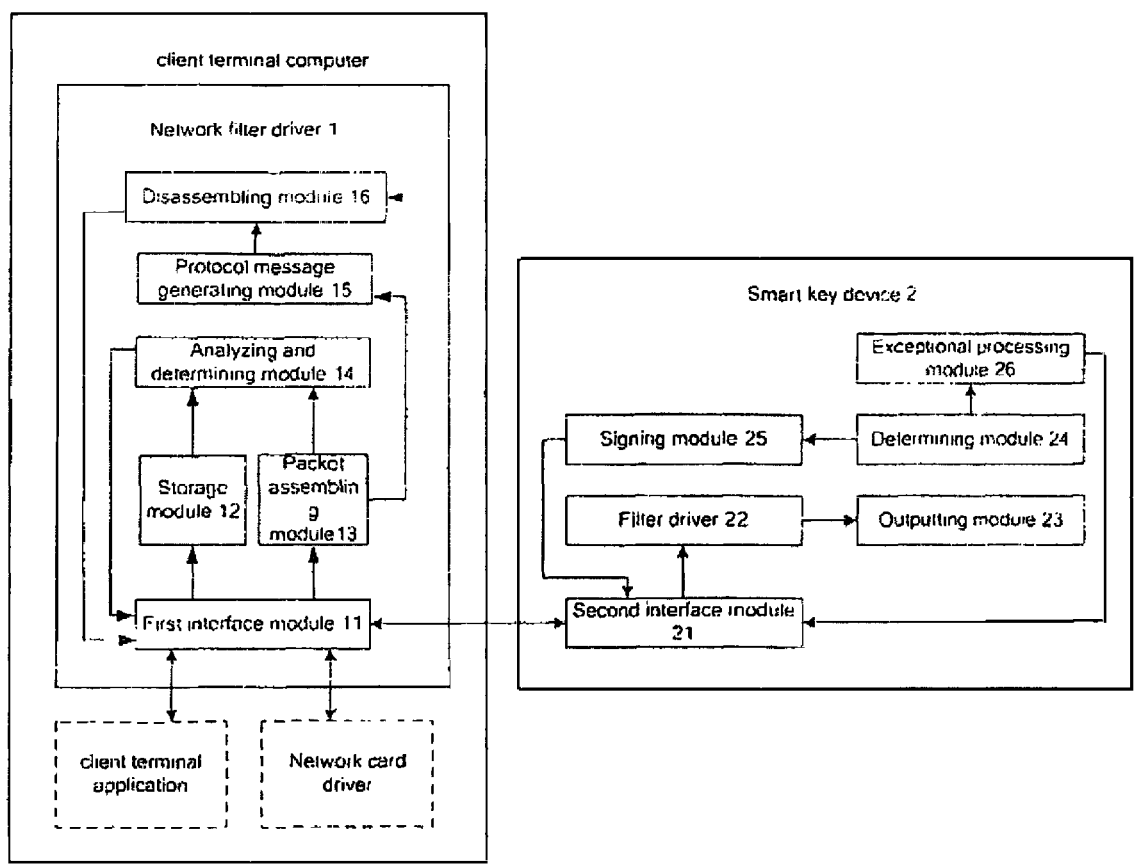
FIG. 2 is a structural diagram illustrating of a system for improving network application security of Embodiment 2 according to the present invention.

Referring to FIG. 2, the embodiment provides a system for improving network application security, which comprises network filter driver 1 and a smart key device 2. Wherein, the network filter driver 1 is installed in a client terminal computer, comprises a first interface module 11 adapted to receive plural IP packets, obtained by disassembling protocol message generated by client application according to information input by a user, from the client terminal application in the client terminal computer; further adapted to communicate with the smart key device and send protocol message to the smart key device; to receive signature data returned by the smart key device; further adapted to send plural IP packets obtained by disassembling new protocol message to network card driver which sends the plural IP packets to a server;

a storage module 12 adapted to cache the plural IP packets received by the first interface module 11;

a packet assembling module 13 adapted to assemble the plural IP packets received by the first interface module 11 to obtain the protocol message;

an analyzing and determining module 14 adapted to analyze the protocol message obtained by the packet assembling module 13 according to the predetermined protocol and determine whether critical information, which is predetermined by the network filter driver 1 and the smart key device 2 and the application server, in the protocol message, and send the protocol message to the smart key device 2 via the first interface module 11 if the critical information is in the protocol message, or send the plural IP packets cached by the storage module 12 to the network card driver, which sends the plural IP packets to the application server, via the first interface module 11;

a protocol message generating module 15 adapted to generate new protocol message according to the signature data received by the first interface module 11 and the protocol message received by the packet assembling module 13;

a disassembling module 16 adapted to disassemble the new protocol message, generated by the protocol message generating module 15, to plural IP packets and send the plural IP packets to the network card driver in the client terminal computer via the first interface module 11;

The smart key device 2 comprises a second interface module 21 adapted to communicate with the network filter driver 1 to receive the protocol message sent from the network filter driver 1, and to send signature data to the network filter driver 1;

a filter module 22 adapted to analyze the protocol message received by the second interface module 21 of the smart key device to obtain the critical information;

an outputting module 23 adapted to output the critical information obtained by the filter module 22 for the user to confirm;

a determining module 24 adapted to receive the confirmation information indicating whether critical information is correct input by the user;

a signing module 25 adapted to sign the protocol message received by the second interface module 21 of the smart key device to obtain the signature data and return the signature data to network filter driver 1 via the second interface module 21 if the confirmation information is that the user confirms that the critical information is correct;

an exceptional processing module 26 adapted to perform exceptional operation if the confirmation information is that the user confirms that the critical information is incorrect or if no confirmation information is received from the user within a predetermined time period.

In the embodiment, the storage module 12 is further adapted to store address of the application server. The packet assembling module 13 comprises a comparing unit adapted to compare the destination addresses in the plural IP packets received by the first interface module 11 of the network filter driver 1 with the address of the application server stored in the storage module 12;

a packet assembling unit adapted to assemble the IP packets, whose destination addresses are same with the address of the application server, from the plural IP packets to obtain the protocol message, and to send the rest of the IP packets to the network card driver via the first interface module 11.

In the embodiment, both the protocol message and the new protocol message contain request header field. The address of the application server is written in the request header field. The storage module 12 further adapted to store the address of the application server. Correspondingly, the analyzing and determining module 14 of the network filter driver 1 comprises a determining unit adapted to analyze the protocol message obtained by the packet assembling module 13 according to the predetermined protocol and determine whether the critical information predetermined by the network filter driver 1, the smart key device 2 and the application server is in the protocol message;

a first processing unit adapted to, if the determining unit determines that the critical information is in the protocol message, analyze the request header field of the protocol message to determine whether the application server address written in the request header field accords with the application server address stored in the storage module 12; if so, to send the protocol message to the smart key device 2 via the first interface module 11; otherwise, to prompt the user that the application server is error.

a second processing unit adapted to, if the determining unit determines that no critical information is in the protocol message, send the plural IP packets cached in the storage module 12 to the network filter driver, which sends the plural IP packets to the application server, via the first interlace module 11.

an identifier analyzing and determining unit adapted to analyze the protocol message obtained by the packet assembling module 13 according to the predetermined protocol and determine whether the critical information identifier is in the protocol message, if so, to send the protocol message to the smart key device 2 via the first interface module 11; otherwise, to send the plural IP packets cached in the storage module 12 to the network card driver, which sends the plural IP packets to the application server, via the first interface module 11;

or an field analyzing and determining unit adapted to analyze the protocol message obtained by the packet assembling module 13 according to the predetermined protocol and find the field specified by the network filter driver 1, the smart key device 2 and the application server in the protocol message, to determine whether there is data in the field, if so, to send the protocol message to the smart key device 2 via the first interface module 11 with the fact that the critical information is in the protocol message, otherwise, to send the plural IP packets cached in the storage module 12 to the network card driver, which sends the plural IP packets to the application server, via the first interface module 11 with the fact that the critical information is not in the protocol message.

In the embodiment, the filter module 22 comprises an identifier filtering unit adapted to determine whether the critical information identifier predetermined by the network filter driver 1, the smart key device and the application server is in the protocol message received by the second interface module 21, and to find the critical information according to the critical information identifier if the critical information identifier is in the critical message;

or an field filtering unit adapted to find the field specified by the network filter driver 1, the smart key device and the application server in the protocol message received by the second interface module 21, and determine whether there is data in the field, and to read the data to obtain the critical information if the there is data in the field.

In the embodiment, the outputting module 23 is a LCD display or an audio device.

In the embodiment, the exceptional processing module 26 comprises a first exceptional processing unit adapted to inform the network filter driver to stop operation and prompt the user that the operation is error if the determining module 24 receives the information that the user confirms that the critical information is not correct or the determining module 24 does not receive any confirmation information from the user;

or a second exceptional processing unit adapted to return signature data with error via the second interface module 21 to the network filter driver if the determining module 24 receives the information that the user confirms that the critical information is not correct or the determining module 24 does not receive confirmation information from the user.

In the embodiment, the first interface module 11 of the network filter driver 1 is further adapted to send the plural data packets cached in the storage module 12 to the network filter, which sends the plural IP packets to the application server, if the analyzing and determining module 14 determines that no critical information is in the protocol message.

In the embodiment, the signing module 25 of the smart key device 2 comprises a signing unit adapted to authenticate the identity of the user by PIN code or biometrics if the determining module 24 receives the information that the user confirmed that the critical information is correct; and to sign the protocol message received by the second interface module 21 and to return the signature data to the network filter driver 1 via the second interface module 21 if the user is legal; or to refuse to sign the protocol message if the user is illegal.

In the embodiment, the protocol generating module 15 of the network filter driver comprises a first generating unit adapted to insert the signature data received by the network filter driver 1 into the protocol message and modify the request header field in the protocol message according to the predetermined protocol to obtain the new protocol message;

or a second generating unit adapted to substitute the specified part in the protocol message with the signature data received by the first interface module 11 of the network filter driver 1 and to modify the request header field in the protocol message according to the predetermined protocol to obtain a new protocol message.

The embodiment of the invention provides a solution that the network filter driver of client terminal determines whether critical information is in the protocol message, if so, the smart key device signs the protocol and returns the signature data to the network filter, the network filter generates new protocol message according to the signature data and sends the new protocol message to network card driver, the network card driver sends the new protocol message to the application server. With good compatibility and usability, the solution improves network application security without modifying the original client terminal, which is adapted to all kinds of client terminal application.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. A method for improving network application security, comprising:

generating, by a client terminal application of a client terminal computer, a protocol message according to information input by a user and disassembling the protocol message to a plurality of IP packets;

receiving and caching, by a network filter driver of the client terminal computer, the plurality of IP packets and assembling the plurality of IP packets to obtain the protocol message;

analyzing, by the network filter driver, the protocol message according to a predetermined protocol, to determine whether critical information predetermined by the network filter driver, a smart key device and an application server is in the protocol message;

if the critical information is in the protocol message, sending, by the network filter driver, the protocol message to the smart key device; and analyzing, by the smart key device, the protocol message to obtain the critical message and outputting the critical message to the user for confirmation;

if the user confirms that the critical message is correct, signing, by the smart key device, the protocol message and returning signature data to the network filter driver, generating, by the network filter driver, a new protocol message according to the signature data and the protocol message, and disassembling the new protocol message to a plurality of IP packets and sending the plurality of IP packets to the application server via network card driver;

if the user confirms that the critical information is not correct or no confirmation information is received from the user within a predetermined time period, performing an exceptional operation by the smart key device;

if the critical information is not in the protocol message, sending, by the network filter driver, the cached plurality of IP packets to the application server via the network filter driver, wherein the step of signing, by the smart key device, the protocol message comprises authenticating, by the smart key device, a user according to PIN code or biometrics, wherein the biometrics include fingerprint, iris, or vein feature;

if the user is legal, signing the protocol message;

if the user is illegal, refusing to sign the protocol message and ending the process.

2. The method for improving network application security of claim 1, wherein the step of receiving and caching, by the network filter driver of the client terminal computer, the plurality of IP packets and assembling the plurality of IP packets to obtain the protocol message comprises receiving and caching, by the network filter driver of the client terminal computer, the plurality of IP packets;

comparing destination addresses in the plurality of IP packets with an address pre-stored in the application server;

assembling the IP packets whose destination addresses are the same as the address of the application server to obtain the protocol message, and sending the IP packets whose destination addresses are not the same as the address of the application server to the network card driver.

3. The method for improving network application security of claim 1, wherein the step of analyzing, by the network filter driver, the protocol message according to the predetermined protocol, to determine whether critical information predetermined by the network filter driver, a smart key device and an application server is in the protocol message comprises analyzing, by the network filter driver, the protocol message according to the predetermined protocol, to determine whether a critical information identifier predetermined by the network filter driver, the smart key device and the application server is in the protocol message; if the critical information identifier is in the protocol message, determining that the critical message is in the protocol message;

or analyzing, by the network filter driver, the protocol message according to the predetermined protocol, to find a field specified by the network filter driver, the smart key device and the application server in the protocol message and determining whether there is data in the field, if there is, determining that the critical information is in the protocol message.

4. The method for improving network application security of claim 1, wherein both the protocol message and the new protocol message contain request header field in which the address of the application server is written.

5. The method for improving network application security of claim 4, wherein the step of sending, by the network filter driver, the protocol message to the smart key device comprises analyzing, by the network filter driver, the request header field of the protocol message to determine whether the address of the application server written in the request header field accords with the application server address stored in the network filter driver;

if it does, sending, by the network filter driver, the protocol message to the smart key device;

if it does not, prompting, by the network filter driver, the user that the application server is in error and ending the process.

6. The method for improving network application security of claim 1, wherein the step of analyzing, by the smart key device, the protocol message to obtain the critical message comprises analyzing, by the smart key device, the protocol message to determine whether a critical information identifier predetermined by the network filter driver, the smart key device and the application server is in the protocol message; if it is, finding the critical message according to the critical information identifier;

or analyzing, by the smart key device, the protocol message to find a field specified by the network filter driver, the smart key device and the application server in the protocol message and determining whether there is data in the field, if there is, reading the data to obtain the critical information.

7. The method for improving network application security of claim 1, wherein the step of outputting the critical message to user for confirmation comprises outputting, by the smart key device, the critical message via an LCD display to the user for confirmation, or broadcasting, by the smart key device, the critical message via voice broadcast to the user for confirmation.

8. The method for improving network application security of claim 1, wherein the step of performing an exceptional operation by the smart key device comprises informing, by the smart key device, the network filter driver to end operation and prompting the user that the operation fails; or returning, by the smart key device, a false signature data to the network filter driver.

9. The method for improving network application security of claim 1, wherein the step of generating, by the network filter driver, a new protocol message according to the signature data and the protocol message comprises inserting, by the network filter driver, the received signature data into the protocol message and modifying request header field according to the predetermined protocol to obtain a new protocol message;

or substituting, by the network filter driver, the received signature data for a specified part in the protocol message and modifying the request header field according to the predetermined protocol to obtain a new protocol message.

10. The method for improving network application security of claim 1, wherein the predetermined protocol comprises Hypertext Transfer Protocol and/or Hypertext Transfer Protocol over Secure Socket Layer.

11. A system for improving network application security, comprising a smart key device and a network filter driver of a client terminal computer;

the network filter driver comprises a first interface module, adapted to receive a plurality of IP packets from a client terminal application in the client terminal computer, wherein the plurality of IP packets are obtained by disassembling a protocol message generated by the client terminal application according to information input by a user; and to communicate with the smart key device, to send the protocol message to the smart key device, and to receive signature data returned by the smart key device; and further adapted to send the plurality of IP packets obtained by disassembling a new protocol message to a network card driver which sends the plurality of IP packets to the application server;

a storage module, adapted to cache the plurality of IP packets received by the first interface module;

a packet assembling module, adapted to assemble the plurality of IP packets received by the first interface module to obtain the protocol message;

an analyzing and determining module, adapted to analyze the protocol message obtained by the packet assembling module according to the predetermined protocol and determine whether critical information, which is predetermined by the network filter driver, the smart key device and the application server, is in the protocol message, and send the protocol message to the smart key device via the first interface module if the critical information is in the protocol message, or send the plurality of IP packets cached by the storage module to the network card driver, which sends the plurality of IP packets to the application server, via the first interface module if the critical information is not in the protocol message;

a protocol message generating module, adapted to generate the new protocol message according to the signature data received by the first interface module and the protocol message received by the packet assembling module;

a disassembling module, adapted to disassemble the new protocol message, generated by the protocol message generating module, to a plurality of IP packets and send the plurality of IP packets to the network card driver in the client terminal computer via the first interface module;

the smart key device comprises a second interface module, adapted to communicate with the network filter driver to receive the protocol message sent from the network filter driver, and to send signature data to the network filter driver;

a filter module, adapted to analyze the protocol message received by the second interface module of the smart key device to obtain the critical information;

an outputting module, adapted to output the critical information obtained by the filter module to the user for confirmation;

a determining module, adapted to receive the confirmation information indicating whether the critical information is correct input by the user;

a signing module, adapted to sign the protocol message received by the second interface module of the smart key device to obtain the signature data and return the signature data to the network filter driver via the second interface module if the confirmation information is that the user confirms that the critical information is correct; and an exceptional processing module, adapted to perform an exceptional operation if the confirmation information is that the user confirms that the critical information is incorrect or if no confirmation information is received from the user within a predetermined time period, wherein the signing module of the smart key device comprises a signing unit adapted to authenticate the identity of the user by PIN code or biometrics if the determining module receives the information that the user confirms that the critical information is correct; and to sign the protocol message received by the second interface module and to return the signature data to the network filter driver via the second interface module if the user is legal; or to refuse to sign the protocol message if the user is illegal.

12. The system for improving network application security of claim 11, wherein the storage module is further adapted to store address of the application server; the packet assembling module comprises a comparing unit adapted to compare the destination addresses in the plurality of IP packets received by the first interface module of the network filter driver with the address of the application server stored in the storage module;

a packet assembling unit adapted to assemble the IP packets, whose destination addresses are same with the address of the application server, from the plurality of IP packets to obtain the protocol message, and to send the IP packets whose destination addresses are not same with the address of the application server to the network card driver via the first interface module.

13. The system for improving network application security of claim 11, wherein both the protocol message and the new protocol message contain request header field, in which the address of the application server is written; the storage module further adapted to store the address of the application server; the analyzing and determining module comprises a determining unit adapted to analyze the protocol message obtained by the packet assembling module according to the predetermined protocol and determine whether the critical information predetermined by the network filter driver, the smart key device and the application server is in the protocol message;

a first processing unit adapted to, if the determining unit determines that the critical information is in the protocol message, analyze the request header field of the protocol message to determine whether the application server address written in the request header field accords with the application server address stored in the storage module; if the application server address written in the request header field accords with the application server address stored in the storage module, to send the protocol message to the smart key device via the first interface module; and if the application server address written in the request header field doesn't accord with the application server address stored in the storage module, to prompt the user that the application server is error;

a second processing unit adapted to, if the determining unit determines that no critical information is in the protocol message, send the plurality of IP packets cached in the storage module to the network filter driver, which sends the a plurality of IP packets to the application server, via the first interface module.

14. The system for improving network application security of claim 11, wherein the analyzing and determining unit comprises an identifier analyzing and determining unit adapted to analyze the protocol message obtained by the packet assembling module according to the predetermined protocol and determine whether the critical information identifier is in the protocol message, if the critical information identifier is in the protocol message, to determine that the critical information is in the protocol message, and to send the protocol message to the smart key device via the first interface module; if the critical information is not in the protocol message, to send the a plurality of IP packets cached in the storage module to the network card driver, which sends the a plurality of IP packets to the application server, via the first interface module;

or an field analyzing and determining unit adapted to analyze the protocol message obtained by the packet assembling module according to the predetermined protocol and find the field specified by the network filter driver, the smart key device and the application server in the protocol message, to determine whether there is data in the field, if there is data in the field, to send the protocol message to the smart key device via the first interface module with the fact that the critical information is in the protocol message, if there is no data in the field, to send the a plurality of IP packets cached in the storage module to the network card driver, which sends the a plurality of IP packets to the application server, via the first interface module with the fact that the critical information is not in the protocol message.

15. The system for improving network application security according to the system of claim 11, wherein the filter module comprises an identifier filtering unit adapted to determine whether the critical information identifier predetermined by the network filter driver, the smart key device and the application server is in the protocol message received by the second interface module, and to find the critical information according to the critical information identifier if the critical information identifier is in the critical message;

or an field filtering unit adapted to find the field specified by the network filter driver, the smart key device and the application server in the protocol message received by the second interface module, and determine whether there is data in the field, and to read the data to obtain the critical information if there is data in the field.

16. The system for improving network application security of claim 11, wherein the outputting module is a LCD display or an audio device.

17. The system for improving network application security of claim 11, wherein the exceptional processing module comprises a first exceptional processing unit adapted to inform the network filter driver to stop operation and prompt the user that the operation is error if the determining module receives the information that the user confirmed that the critical information is not correct or the determining module does not receive any confirmation information from the user in a predetermined time period;

or a second exceptional processing unit adapted to return false signature data via the second interface module to the network filter driver if the determining module receives the information that the user confirms that the critical information is incorrect or the determining module does not receive confirmation information from the user in a predetermined time period.

18. The system for improving network application security of claim 11, wherein the protocol generating module of the network filter driver comprises a first generating unit adapted to insert the signature data received by the network filter driver into the protocol message and modify the request header field in the protocol message according to a predetermined protocol to obtain the new protocol message;

or a second generating unit adapted to substitute the specified part in the protocol message with the signature data received by the first interface module of the network filter driver and to modify the request header field in the protocol message according to the predetermined protocol to obtain a new protocol message.

* * * * *